United States Patent [19]

Gaku et al.

[11] 4,110,364

[45] Aug. 29, 1978

[54] CURABLE RESIN COMPOSITIONS OF CYANATE ESTERS

[75] Inventors: Morio Gaku; Kazuhiro Suzuki; Kazuyuki Nakamichi, all of Tokyo, Japan

[73] Assignee: Mitsubishi Gas Chemical Company, Inc., Japan

[21] Appl. No.: 559,650

[22] Filed: Mar. 18, 1975

[30] Foreign Application Priority Data

Mar. 19, 1974 [JP]   Japan .................................. 49-30636
Apr. 8, 1974 [JP]   Japan .................................. 49-38915

[51] Int. Cl.$^2$ ..................... C08G 73/00; C08G 73/112
[52] U.S. Cl. ..................................... 528/170; 260/823; 260/836; 260/857 R; 260/857 UN; 528/86; 528/119; 528/117; 528/211; 528/172; 528/322; 528/253; 528/248
[58] Field of Search ........... 260/47 R, 47 CP, 47 UA, 260/49, 78 UA, 78 TF, 78.41, 47 EP, 47 EN, 836, 857 R, 823, 857 UN

[56] References Cited

U.S. PATENT DOCUMENTS

| 3,694,410 | 9/1972 | Oehmke .............................. 260/47 R |
| 3,738,962 | 6/1973 | Loudas et al. ...................... 260/47 R |
| 3,770,705 | 11/1973 | Akiyama et al. ............... 260/78 UA |
| 3,864,309 | 2/1975 | Bilow et al. ..................... 260/47 UA |
| 3,928,286 | 12/1975 | Akiyama et al. ............... 260/47 UA |
| 3,978,152 | 8/1976 | Gruffaz et al. .................. 260/830 P |

*Primary Examiner*—Lester L. Lee
*Attorney, Agent, or Firm*—Wenderoth, Lind & Ponack

[57] ABSTRACT

A curable resin composition comprising (a) a cyanate ester component selected from the group consisting of polyfunctional aromatic cyanate ester monomers having at least 2 cyanate groups bonded to their aromatic ring, prepolymers of the cyanate esters and prepolymers of the cyanate ester monomers and amines, and (b) a bismaleimide component selected from the group consisting of bismaleimides, bismaleimide prepolymers and prepolymers of the bismaleimides and amines;

the weight ratio of the component (a) to (b) being 1:99 to 99:1.

11 Claims, 7 Drawing Figures

CURABLE RESIN COMPOSITIONS OF CYANATE ESTERS

This invention relates to curable resin compositions, and more specifically to novel curable resin compositions which are useful for such applications as adhesives, coating agents, laminating materials or molding materials and can be cured by a suitable means such as heating.

A number of studies have recently been reported on the synthesis of a bismaleimide from maleic anhydride and a diamine through a bismaleamide acid and the utilization of the bismaleimide as a constituent monomer of curable resins. Many of the attempts to produce curable resins from bismaleimides involve preparing a prepolymer from the bismaleimide and a polyamine such as diamines, and heating the prepolymer in the presence, if desired, of a curing agent. The curable resins derived from the bismaleimides are satisfactory in that they have superior thermal stability, but on the other hand, cannot be free from such defects as poor adhesiveness.

It has also been proposed to produce curable resins by heat-curing cyanate esters or their prepolymers with or without polyamines such as diamines. The curable resins derived from the cyanates have satisfactory electrical properties such as dielectric characteristics, but have the defect of suffering from poor thermal stability (especially, when exposed to high temperatures for long periods of time), moisture resistance and adhesiveness.

Epoxy resins, on the other hand, have the defect of poor thermal stability although having good adhesion to base materials.

The common defects of these bismaleimide resins, cyanate resins and epoxy resins, especially those of the cyanate resins, are that they generally require long periods of time for heat curing (that is, gellation), and have poor operability or productivity when used in applications such as those exemplified above.

We have now found that a component selected from cyanate esters, their prepolymers and prepolymers of cyanate esters and amines and a component selected from the group consisting of bismaleimides, their prepolymers, and prepolymers of bismaleimides and amines react with each other uniquely (a co-curing reaction) to give novel curable resins, and starting from this finding, finally discovered that by causing an epoxy compound to be present during the curing of the above two components, resins having a desirable combination of superior thermal stability, adhesiveness or intimate contact, and electrical characteristics can be prepared.

According to this invention, there is provided a curable resin composition comprising (a) a cyanate component selected from the group consisting of polyfunctional aromatic cyanate esters having at least 2 cyanate groups bonded to the aromatic ring, prepolymers of the cyanate esters and prepolymers of the cyanate ester monomers and amines, and (b) a bismaleimide component selected from the group consisting of bismaleimides, prepolymers of bismaleimides and prepolymers of the bismaleimides and amines; the weight ratio of component (a) to component (b) being from 1:99 to 99:1.

In an embodiment of this invention, there is provided a curable resin composition comprising the components (a) and (b) in the proportions specified above and not more than 10% by weight, based on the entire components, of an amine component (d).

According to another embodiment of this invention, there is provided a curable resin composition comprising the components (a) and (b) in the proportions specified above, and (c) an epoxy compound component and (d) an amine component; the amount of the component (c) satisfying the following conditions:

(i) when the amount of either the component (a) or (b) whichever is larger in amount (such a component will sometimes be referred to hereinbelow as a major component in the sense that it is larger in amount) is 65 to 95% by weight based on the total amount of the components (a) and (b), ratio (I) given by the following equation $$\text{ratio (I)} = \frac{\text{Mols of component } (c)}{\text{Mols of major component}}$$

is 0.05 to 4, and (ii) when the amount each of the component (a) and (b) is more than 35% by weight to less than 65% by weight, ratio (IIa) and ratio (IIb) given by the following equations $$\text{ratio (IIa)} = \frac{\text{Mols of component } (a)}{\text{Mols of component } (c)}$$

$$\text{ratio (IIb)} = \frac{\text{Mols of component } (b)}{\text{Mols of component } (c)}$$

are both not more than 1, and the amount of component (d) being such that ratio (III) given by the following equation $$\text{ratio (III)} = \frac{\text{Weight of component } (d) \times 100}{\text{Total weight of } (a) + (b) + (c) + (d)} \, (\%)$$

is up to 10%.

Heat cured resins obtained by curing the curable resin composition comprising components (a) and (b) in accordance with this invention are clearly distinguished from heat-cured resins obtained by the reaction of bismaleimides with polyamines, or heat-cured resins obtained by the reaction of cyanate esters with themselves or with polyamines. This will be more readily understood from the experimental results which are shown in Example 5 given hereinbelow. For example, a mixture of a cyanate ester obtained by the reaction of bisphenol A and a cyanogen halide, and a prepolymer thereof (KU 6573, a tradename of a product of Bayer AG, West Germany) shows a gellation time of 3350 seconds at 170° C., and a bismaleimide-diamine prepolymer prepared by reacting a bismaleimide prepared from maleic anhydride and 4,4'-diaminodiphenyl methane with 4,4'-bis-aminodiphenyl methane (KERIMID 601, a tradename for a product of Rhone-Poulenc S.A., France exhibits a gellation time of 180 seconds under the same conditions. On the other hand, a composition in accordance with this invention which consists of (1) a mixture of the cyanate and its prepolymer and (2) the bismaleimidediamine prepolymer in a (1):(2) weight ratio of 60:40 surprisingly shows a gellation time of as short as 48 seconds under the same conditions.

The fact that the curable resin composition comprising the components (a) and (b) exhibits a shorter gellation time than that of either of the component (a) or (b) alone or an arithmetic mean of the gellation times of components (a) and (b) suggests that under the curing conditions, a reaction between the components (a) and (b) (co-curing reaction) takes place, and the reaction is different from the reaction of the component (a) or (b) alone in the composition of this invention.

In one preferred embodiment of the present invention described above, the curable resin composition comprises the components (a), (b), (c) and (d). This composition is also clearly distinguished from known compositions comprising components (a) and (c) or compositions comprising components (b) and (c) in that a reaction between components (a) and (b) takes place within the curing conditions. This fact will be easily understood from the experimental results which are shown in Example 10 given hereinbelow.

As can be seen from Example 10, the gellation time of the resin composition comprising the components (a), (b) and (c) varies over a wide range under the curing conditions (heating at 170° C.). However, resin compositions containing component (a) (Samples 2 and 3) have a shortened gellation time as compared with a resin composition not containing the component (a) (Sample 1). Likewise, resin compositions containing component (b) (Samples 4 and 7) have a somewhat shortened gellation time as compared with resin compositions not containing component (b) (Samples 5, 6 and 8). Thus, the fact that a curable resin composition containing both the components (a) and (b) exhibit a shorter gellation time than resin compositions which lack either one of these components suggests that under the curing conditions, a reaction between the components (a) and (b), which is different from a curing reaction between the components (a) and (c) and a curing reaction between the components (b) and (c), occurs in the resin composition of this invention.

Because such a reaction as mentioned above takes places between the components of the resin composition of this invention under the curing conditions, the resulting cured resins also have different chemical and physical properties from resins obtained by curing each of the above components alone.

This fact is clearly seen from the infrared absorption spectrum charts attached to this application as FIGS. 1 to 7.

FIGS. 1 to 7 are charts of infrared absorption spectra.

The cured resins of which infrared absorption spectra are shown in the attached drawings were prepared by heating the respective curable materials at 170° C. for 2 hours, and then at 190° C. for 2 hours. For the curing of KU-6573 as component (a), 0.05 PHR [parts per 100 parts of the component (a)] of triethylene diamine, 0.10 PHR of catechol and 0.20 PHR of a zinc octylate solution (8% Zn) were added.

Figure 1:
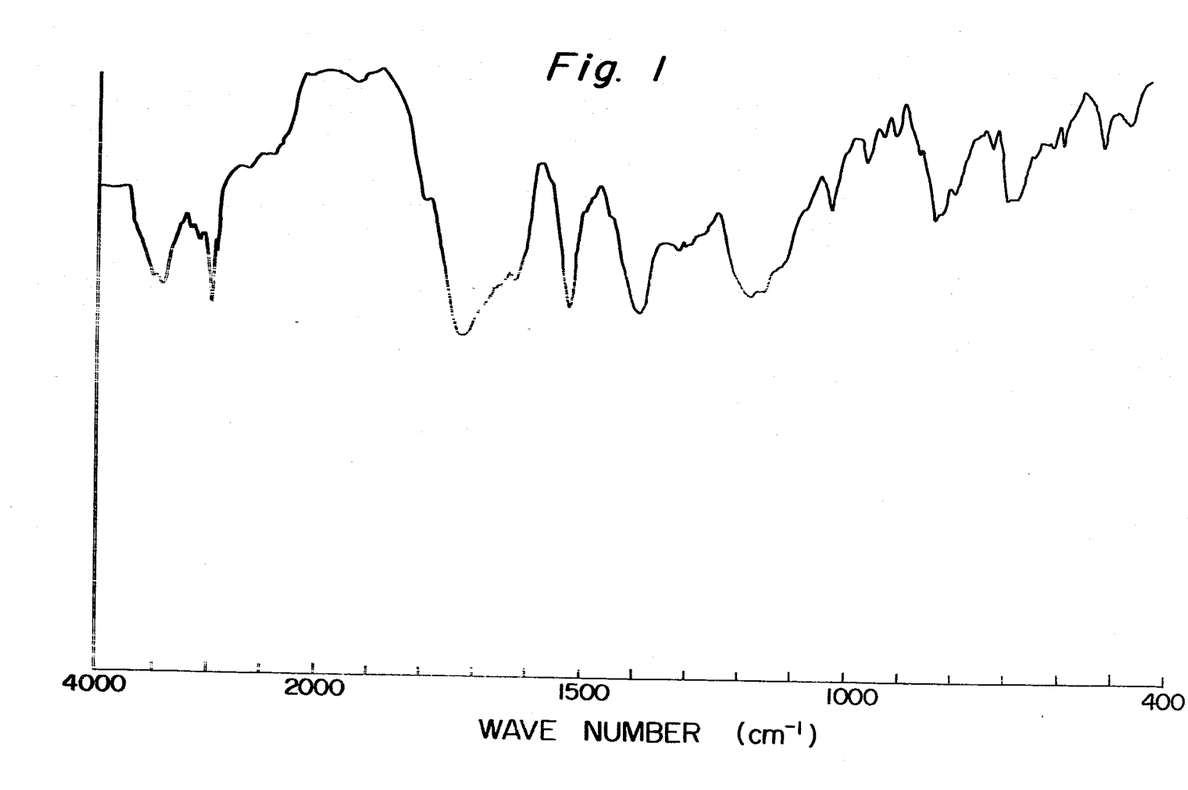
FIG. 1 is a chart showing the infrared absorption spectrum of a cured product of a bismaleimidediamine prepolymer [component (b)] (KERIMID 601, a tradename)
Figure 2:
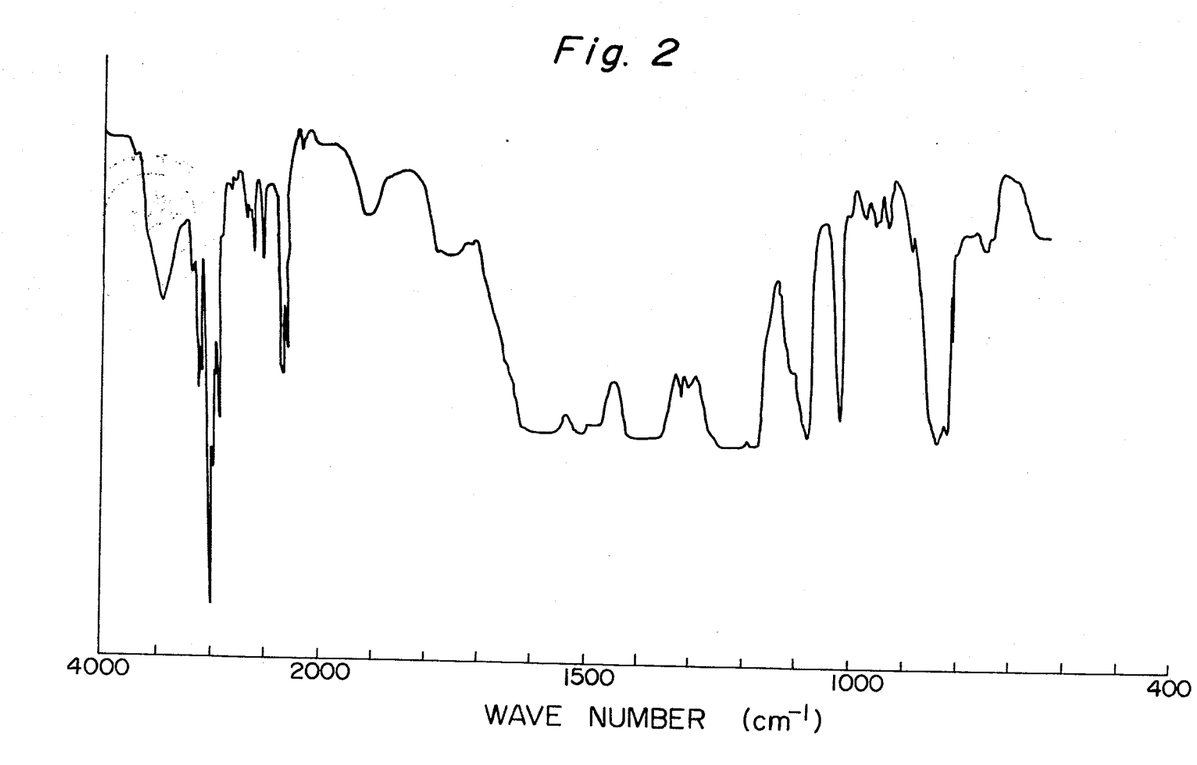
FIG. 2 is a chart of the infrared absorption spectrum of a cured product of a mixture of a cyanate ester monomer and its prepolymer [component (a)] (KU-6573, a tradename)
Figure 3:
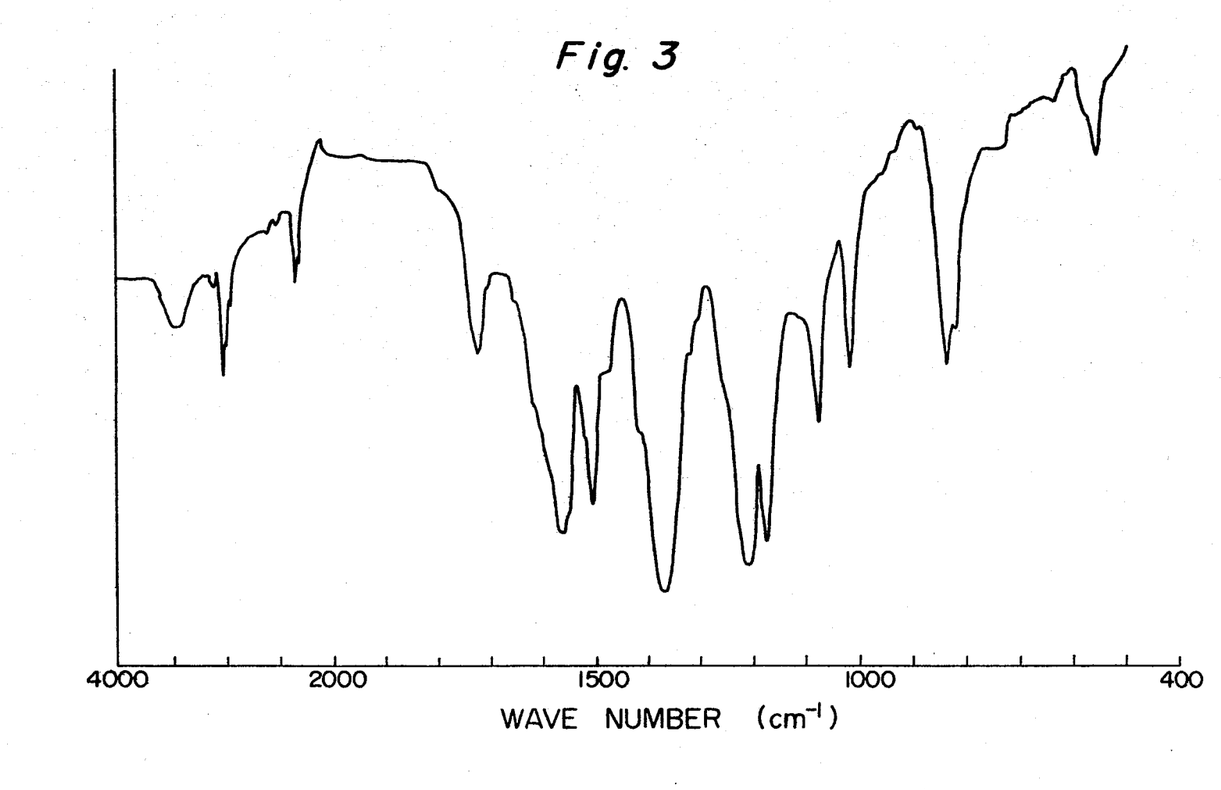
FIG. 3 is a chart of the infrared absorption spectrum of a mere mixture of 90 parts of a cured product of KU-6573 (tradename) and 10 parts of KERIMID 601 (tradename)
Figure 4:
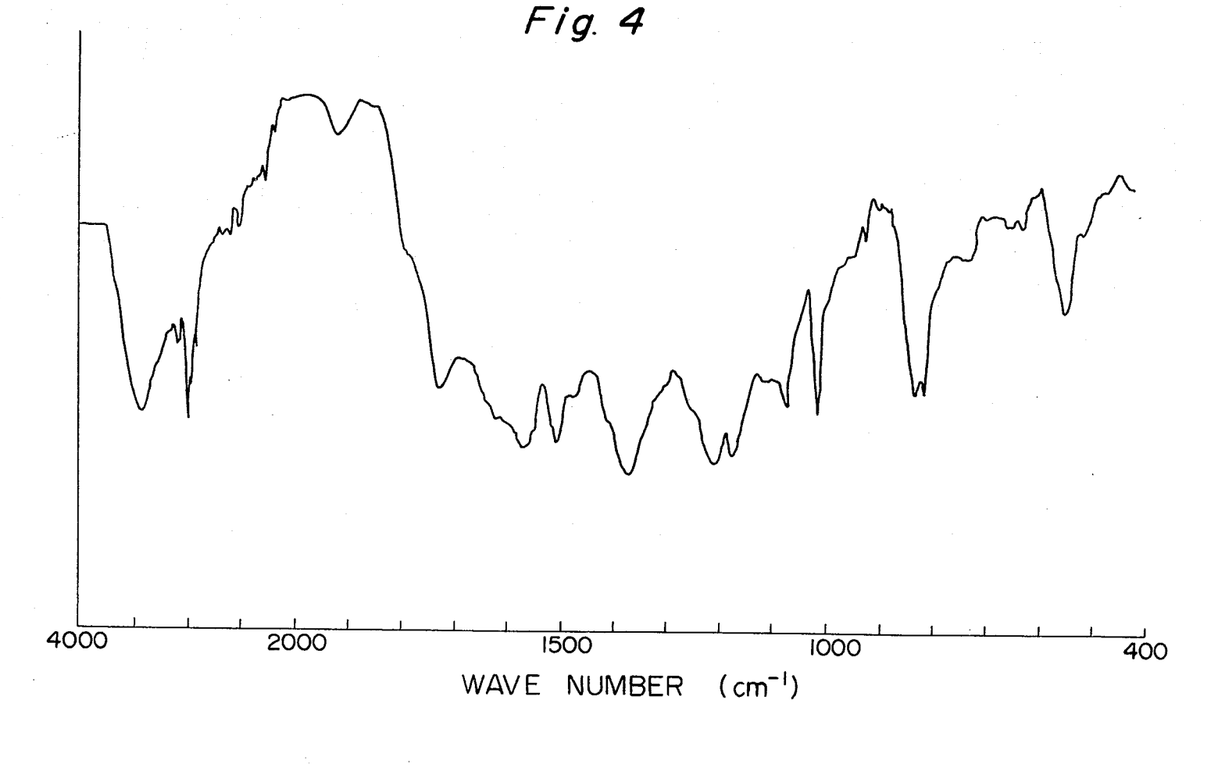
FIG. 4 is a chart of the infrared absorption spectrum of a cured product of a composition of this invention consisting of 90 parts of KU-6573 [component (a)], 10 parts of KERIMID 601 [component (b)] and 3 parts of 2-ethyl-4-methyl imidazole (2E4MZ for short) [component (d)]
Figure 5:
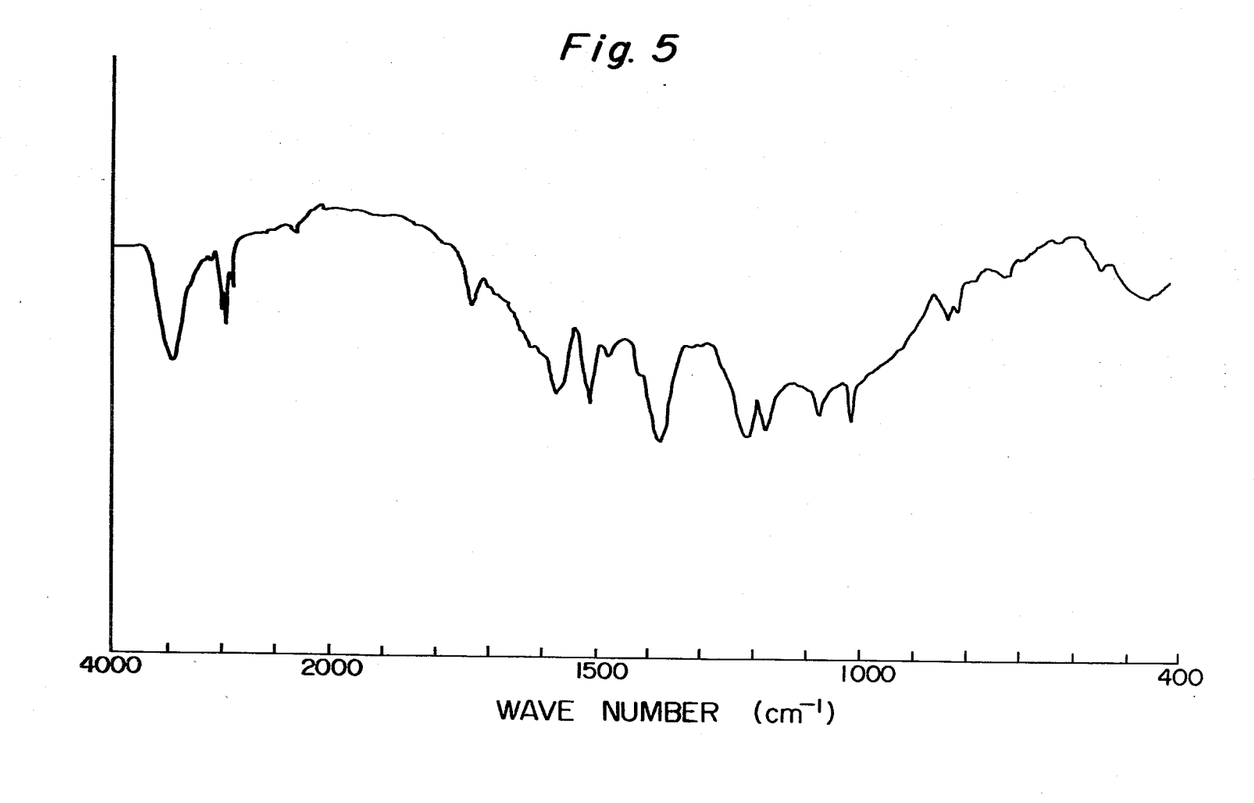
FIG. 5 is a chart of the infrared absorption spectrum of a laminated plate obtained by laminating the above composition of this invention on a base plate of glass.
Figure 6:
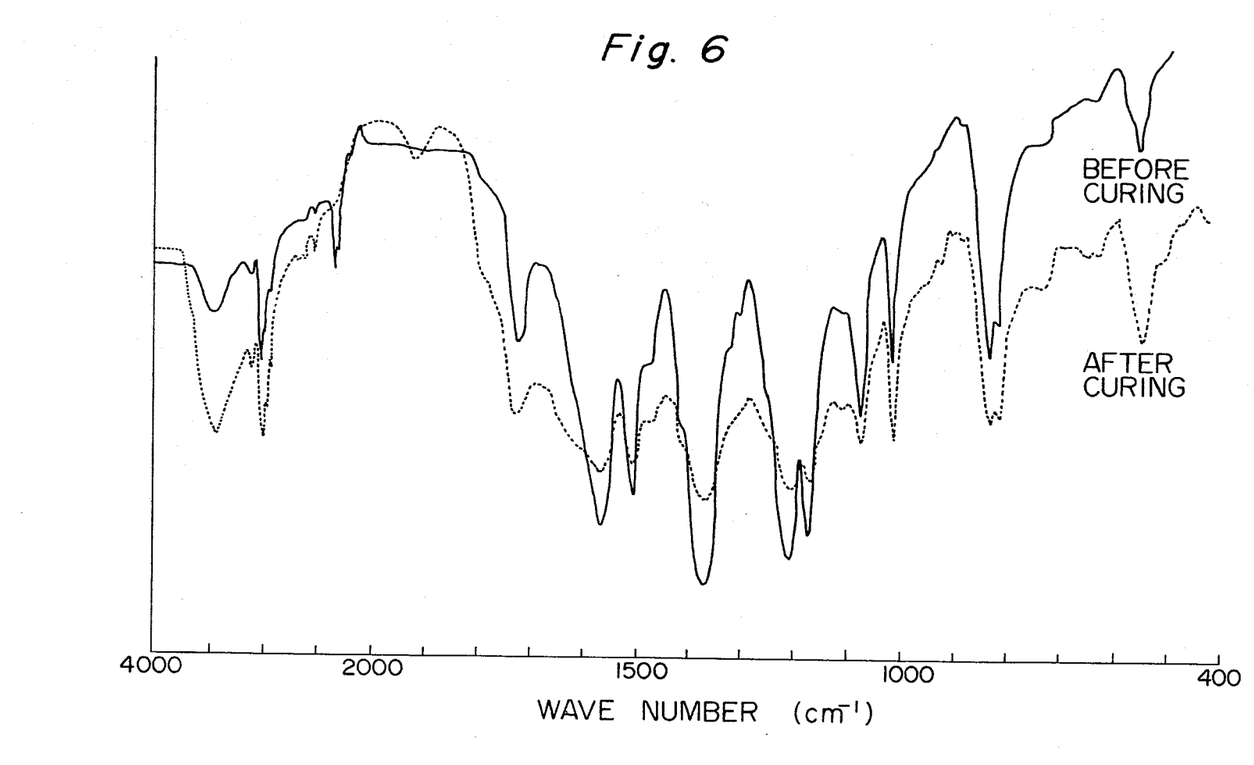
FIG. 6 is a chart of the infrared absorption spectrum of the composition of this invention shown in FIG. 4 before (solid line) and after (dotted line) curing.
Figure 7:
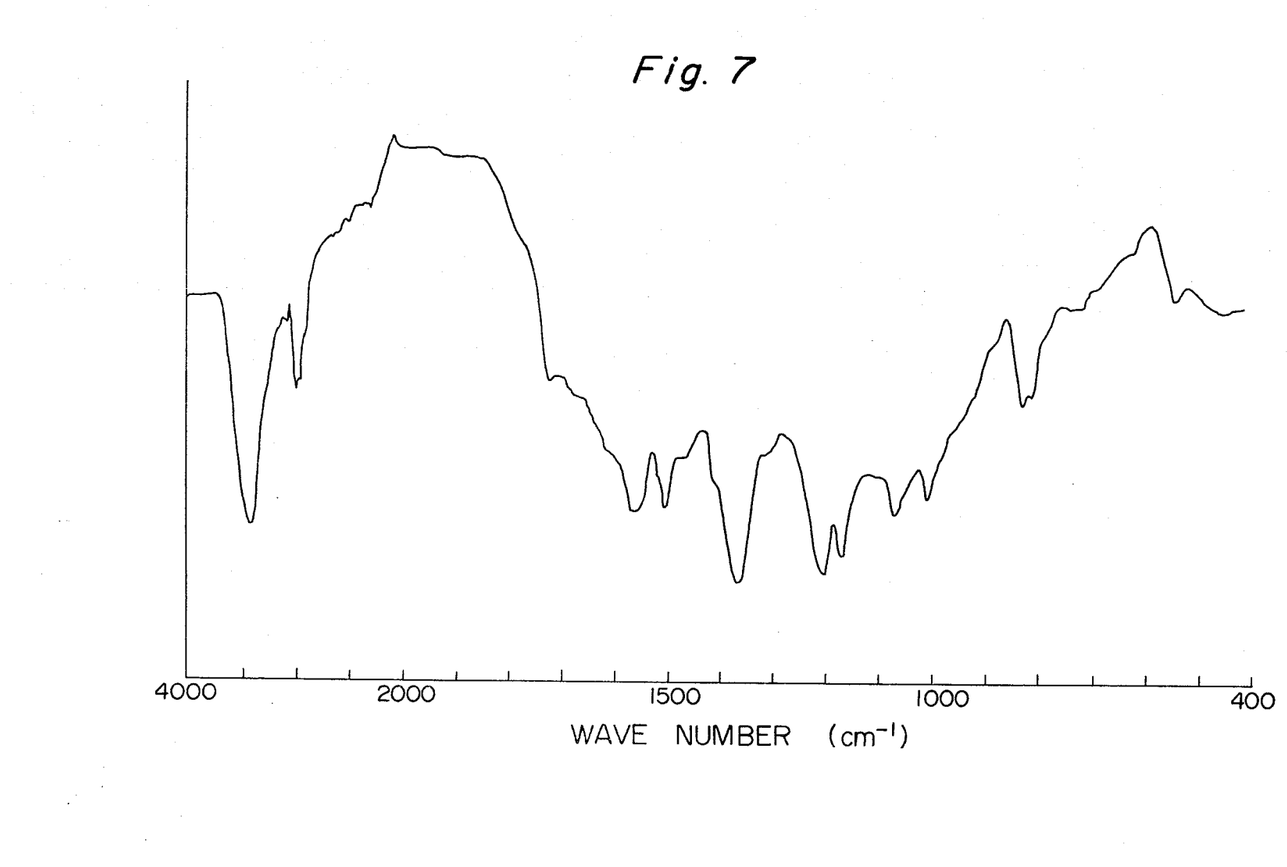
FIG. 7 is a chart of the infrared absorption spectrum of a cured product of a composition consisting of 82 parts of KU-6573 [component (a)], 9 parts of KERIMID 601 [component (b)], 9 parts of an epoxy resin (DER 542, a tradename) [component (c)], and 3 parts of 2E4MZ [component (d)].

In the infrared absorption spectrum of the cured product of component (a) (see FIG. 2), an absorption ascribable presumably to the group —OCN is observed in the vicinity of 2300 cm$^{-1}$. This absorption is also observed in the infrared absorption spectrum of the mere mixture of the cured product of component (a) and the cured product of component (b) (FIG. 3). On the other hand, the —OCN absorption is absent in the spectrum charts of the cured product of the composition of this invention containing the components (a) and (b) (see FIG. 4) and the cured product of the composition of this invention containing the components (a), (b) and (c) (see FIG. 7). The above analysis suggests that the cured products of the novel curable resin compositions of the present invention have different chemical structures from cured products of the individual components.

When the novel curable resin composition of this invention are used in such applications as adhesives, coating agents, laminating materials or molding materials, the required time for curing can be markedly shortened, or the operability or productivity can be increased greatly. Furthermore, milder curing conditions can be employed.

In addition to the above advantages, cured resins obtained from the novel curable resin compositions of this invention have a more stable chemical structure and a desirable combination of superior thermal stability, intimate contact or adhesion and electrical characteristics, unlike the conventional resins derived from component (a), because they do not substantially contain the group —OCN.

While curable resins derived from cyanate esters or curable resins derived from bismaleimides have unsatisfactory adhesion to base materials, the present invention can provide curable resin compositions having enhanced adhesion to base materials by combining the cyanate ester component and the bismaleimide component. Addition of an epoxy compound to this combination brings about better adhesion to base materials. Moreover, this improvement can be achieved without substantially impairing the superior thermal stability and the superior electrical characteristics of the cyanate resins. Thus, the resin compositions of this invention have a desirable combination of superior thermal stability, intimate contact or adhesion, and electrical characteristics, and by changing the proportions of the components of the composition, these characteristics can be adjusted to the desired combination of properties at the desired level.

The component (a) of the curable resin composition of this invention is selected from polyfunctional cyanate monomers, prepolymers thereof and prepolymers of the cyanate monomers and amines.

The polyfunctional cyanate monomers that can be used in this invention are any organic compounds containing at least 2 cyanate groups, especially aromatic compounds. Suitable cyanate monomers are expressed by the following general formula

$$R \text{+} O\text{—}C \equiv N)_n \qquad (1)$$

wherein $n$ is a number of at least 2, and usually not more than 5, and R is an aromatic organic group, the cyanate groups being bonded to the aromatic ring of R.

The organic group R may be

(i) residues having a valence of at least 2 and derived from aromatic hydrocarbons containing 6 to 16 carbon atoms, such as benzene, nephthalene, anthracene or pyrene;

(ii) organic groups consisting of a plurality of aromatic rings bonded directly or through a bridging atom or group, for example, those expressed by the following formula (2)

wherein $m$ is zero or 1, and $R^1$ is a divalent aliphatic, aromatic or araliphatic hydrocarbon group, an oxygen atom, a sulfur atom, a carbonyl group, a sulfonyl group, a sulfinyl group, an alkyleneoxyalkylene group, an imino group, (iii) groups derived from novolac-type phenol resins.

These aromatic organic groups may be replaced at their aromatic ring by a substituent which does not participate in the reaction, such as an alkyl group contaning 1 to 4 carbon atoms (e.g., methyl or ethyl), alkoxy groups containing 1 to 4 carbon atoms (e.g., methoxy or ethoxy), a halogen atom (e.g., chlorine or bromine), or a nitro group.

Examples of suitable organic groups of the general formula (2) are those derived from biphenyl, diphenylmethane, α,α-dimethylphenylmethane, diphenyl ether, diphenyl dimethylene ether, diphenyl thioether, diphenyl ketone, diphenyl thioether, diphenyl ketone, diphenylamine, diphenyl sulfoxide, diphenyl sulfone, triphenyl phosphite, and triphenyl phosphate.

Generally, these cyanate ester monomers can be prepared by a method known per se which comprises reacting polyhydric phenols with cyanogen halides. Polyfunctional cyanate esters which are readily available and preferred in this invention in view of the properties of the final resin obtained are those obtained by reacting symmetrical, fused ring-free dihydric phenols such as bisphenyl A [2,2-bis(4'-hydroxyphenyl)propane] with cyanogen halides. Likewise, cyanate esters obtained by the reaction of a phenol-formaldehyde precondensate with cyanogen halides can be advantageously used.

The polyfunctional cyanate ester as component (a) can also be used in the form of a prepolymer. The prepolymer is prepared by polymerizing the polyfunctional cyanate monomer in the presence of a catalyst, for example, a mineral acid, a Lewis acid, a salt such as sodium carbonate or lithium chloride, or a phosphoric acid ester such as tributyl phosphine. The prepolymer contains a triazine ring generally in the molecule as a result of the trimerization of the cyano group of the cyanate ester. Preferred prepolymers are those having an average molecular weight of at least 400, especially up to 6000.

The polyfunctional cyanate ester can be used in the form of a mixture of the monomer and the prepolymer. For example, many of commercially available cyanate esters derived from bisphenol A and cyanogen halides are in the form of a mixture of cyanate monomers and prepolymers, and such materials can also be used in the present invention.

The component (b) of the curable resin composition of this invention is selected from bismaleimides, prepolymers thereof and prepolymers of the bismaleimides and amines.

The bismaleimides used in this invention are any organic compounds containing two maleimide groups and derived from maleic anhydride and diamines. The bismaleimides that can be suitable used in this invention. Suitable bismaleimides are expressed by the following general formula (3)

wherein $R^2$ is a divalent aromatic or alicyclic organic group.

Examples of the divalent organic group $R^2$ in the formula (3) are (i) aromatic or alicyclic hydrocarbon groups containing 6 to 16 carbon atoms such as a phenylene, naphthylene, xylylene, cyclohexylene or hexahydroxylylene, and (ii) organic groups consisting of a plurality of aromatic rings bonded to each other directly or through a bridging atom or group, for example, those expressed by the following formula (2)

(2)

wherein $m$ and $R^1$ are as defined hereinabove.

In formula (3), the divalent organic group $R^2$ may contain an organic group which does not participate in the reaction, such as an alkyl group containing 1 to 4 carbon atoms (e.g., methyl or ethyl), or an alkoxy group containing 1 to 4 carbon atoms (e.g., methoxy or ethoxy), at the aromatic ring when it is an aromatic organic group or at the alicyclic ring when it is an alicyclic organic group.

The bismaleimide can be prepared by a method known per se which comprises reacting maleic anhydride with diamines, and then cyclodehydrating the resulting bismaleamide acids. The diamines are preferably aromatic diamines in view of the thermal stability of the final resins. When it is desired to improve the flexibility or suppleness of the resin, alicyclic diamines may be used alone or in combination with the aromatic diamines. From the viewpoint of reactivity, the diamines are preferably primary diamines, but secondary diamines can also be used. Examples of suitable diamines are m-phenylene diamine, m-, or p-xylylendiamine, 1,4-cyclohexane diamine, hexahydroxylylene diamine, 4,4'-bisaminophenyl methane, 4,4'-bisaminophenyl sulfone, bis(4-amino-3-methylphenyl) methane (MDT), bis(4-amino-3,5-dimethylphenyl)methane (MDX), 4,4'-bisaminophenylcyclohexane, 4,4'-bisaminophenyl ether, 2,2-bis(4'-aminophenyl)propane, 2,2-bis(4-amino-3-methylphenyl)methane, and α,α-bis(4-aminophenyl)phenylmethane.

The bismaleimides can be used either alone or in admixture of two or more.

Prepolymers of the bismaleimides, and prepolymers of the bismaleimides and amines can also be used as component (b).

It is essential that the curable resin composition of this invention contains the components (a) and (b) described above. It may further comprise an epoxy compound (c). A resin composition comprising components (a), (b) and (c) is a preferred embodiment of this invention. The epoxy compound used in this embodiment is a high-molecular-weight compound containing at least 1, especially at least 2, epoxy groups in the molecule. Generally, in view of the adhesion or intimate contact of the final resin products, the epoxy compounds desirably have an epoxy equivalent of 70 to 6000, especially 170 to 4000. One type of epoxy resins that can be suitably used in this invention is a bisepoxy compound of the following general formula (4)

wherein n is zero or a positive number, preferably 0 to 12.

The same divalent organic groups cited hereinabove with regard to cyanate esters can be used as the divalent groups $R^3$ in formula (4).

These epoxy compounds, depending upon the extent of polymerization or the type of the divalent organic group contained in the main chain, are available in a wide range of forms from relatively low viscosity liquid to relatively high melting solid, but all of such epoxy compounds can be used in the present invention.

These epoxy compounds, especially bisepoxy compounds, are prepared by reacting polyhydric phenols with epihalohydrins such as epichlorohydrin in the presence of a base such as an alkali hydroxide. Instead of reacting polyhydric phenols with epihalohydrins, the diamines described in detail hereinabove with regards to the bismaleimides may be reacted with epihalohydrin to form bisepoxy compounds. Examples of epoxy compounds readily available and suitable for the object of this invention are those derived from bisphenol A, or a chlorine- or bromine-substituted derivative of bisphenol A and epihalohydrins, or epoxy compounds derived from a precondensate of phenol and formaldehyde and epihalohydrins.

An amine such as diamines can be further incorporated in the curable resin composition of this invention. As already stated, the amine can be incorporated in the form of a prepolymer of the polyfunctional cyanate ester and the amine as component (a) or a prepolymer of the bismaleimide and the amine as component (b). Besides, the amine can be included in the resin composition as an independent component (d).

Examples of the amines that can be used in this invention include (i) diamines of the general formula wherein $R^2$ is a divalent aromatic or alicyclic organic group, especially those illustrated with regards to the production of bismaleimides, and (ii) polyamines such as hexamethylene tetramine, polyethylene imine, polyamino styrene or polyvinyl imidazole; triethylene diamine; imidazoles such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole or 1-guanaminoethyl-2-methylimidazole, and adducts formed between these imidazoles and trimellitic acid.

When the above-mentioned amines are used in the form of a prepolymer with bismaleimides, the prepolymer can be produced by reacting the bismaleimide and the diamine, especially 1 mol of the bismaleimide and ½ to 1 mol of the diamine, in a suitable solvent such as ketones under the known conditions, for example, by heating at a temperature of about 40° to 250° C. for 5 minutes to 5 hours. The prepolymer derived from the bismaleimide and the diamine, although differing according to the ratio of the monomers or the degree of polyaddition, are considered to have the structure represented by the following formulae wherein m is zero or a positive number, generally not more than 10, and $R^2$ is the same as defined hereinabove.

When the amines are incorporated in the composition in the form of prepolymers with cyanate esters, the prepolymers can be produced by reacting the cyanate ester monomers with the diamines, preferably using 0.1 to 1 equivalent of the diamines based on the cyanate ester monomers, in a suitable solvent such as ketones at a temperature of about 0° to 100° C. for 1 minute to 1 hour.

In either of these cases of adding amines in the form of prepolymers, it is of course permissible to cause free amines to be present in the composition.

When the amines are included as component (a) and/or component (b) in the form of a prepolymer, they are considered to function mainly as a modifier for polymer such as a chain extender, whereas free amines are considered to play a role of a curing agent.

The components of the curable resin composition of this invention can be varied over a wide range. Generally, however, the weight ratio of component (a) to component (b) is 1:99 to 99:1, preferably 5:95 to 95:5. According to the desired end use or required properties of the final cured resin, the ratio of these components (a) and (b) is properly determined. When it is desired to obtain cured resins having superior electrical characteristics such as dielectric characteristic possessed by the cyanate resins, the weight ratio of the components (a) and (b) is so determined that component (a) is far larger in amount than component (b). Preferably, the amount of the component (a) is adjusted to 65–95% based on the total weight of the components (a) and (b). This instance will be referred to as case I in the present application. Compositions of this invention in accordance with case I give final cured resins having superior electrical characteristics and improved thermal stability.

When the thermal stability of the bismaleimide resin is especially desired in the final cured resins, the weight ratio of the components (a) and (b) is so determined that the amount of the component (b) is far larger than that of component (a). Preferably, the amount of the component (b) is adjusted to 65 to 95% based on the total weight of the components (a) and (b). This instance will be referred to in the present application as case II. Compositions in accordance with case II give final cured resins having especially surperior thermal stability and improved electrical characteristics.

Compositions of this invention in which unlike the cases I and II above, the amounts of the components (a) and (b) are relatively close to each other give final cured resins which have the superior properties of the cyanate ester resins and the bismaleimide resins in a well balanced relation. When such compositions of this invention are desired, it is preferred that the amount each of the components (a) and (b) is adjusted to more than 35% by weight to less than 65% by weight based on the total weight of the components (a) and (b). This instance will be referred to in the present application as case III.

When it is desired to obtain final cured resins of modified properties by incorporating the component (c), the proportion of component (c) is preferably determined on the following standard.

In Case I, the epoxy compound (c) is used in a proportion of 0.05 to 4 mols, especially 0.1 to 3 mols, per mol of the component (a). According to this embodiment, final resin products can be obtained which have markedly improved thermal stability or adhesion while retaining the superior electrical properties such as dielectric characteristics of the cyanate ester resins.

In case II, the epoxy compound (c) is used in a proportion of 0.05 to 4 mols, preferably 0.1 to 3 mols, per mol of the component (b). According to this embodiment, especially, final resin products can be obtained which have markedly improved thermal stability, adhesion, and electrical properties.

In case III, the component (a) is used in a proportion of not more than 1.0 mol, preferably 0.34 mol to 1.0 mol, and the component (b), in a proportion of not more than 1.0 mol, preferably 0.34 mol to 1.0 mol, per mol of the component (c).

Where the composition of this invention contains component (c) and large quantities of components (a) and (b) as compared with the component (c), and the amounts of the components (a) and (b) are almost equal to each other, the gellation time of the resin composition becomes extremely short, and the properties of the cured products tend to be deteriorated. Generally, therefore, such recipes are not recommended.

The amount of the free amines as component (d) is not more than 10% by weight, desirably 0.05 to 5% by weight based on the total weight [(a)+(b)+(c) or (a)+(b)+(c)+(d)] of the entire components. The amount of the amine to be included in the composition of this invention in the form of a prepolymer with the cyanate ester or bismaleimide preferably does not exceed the total mols of the cyanate ester and the bismaleimide.

The components (a),(b),(c) and (d) can each be used in any desired form such as solid, solution or dispersion. These components are mixed in solvent or in the absence of a solvent to form the compositions of this invention. For example, the mixing procedure comprises mixing solutions of component (a) and/or component (c) either separately or together in a suitable inert organic solvent, for example, ketones such as methyl ethyl ketone, esters such as ethyl acetate, ethers such as dibutyl ether, and amides such as dimethyl foramide and a solution of component (b) in a suitable organic solvent such as N-methyl pyrrolidone or dimethyl formamide, if desired together with a solution of an amine in an organic solvent such as ketones, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resin components are maintained in the state of solution without gellation, such reactions do not particularly affect the operability of the resulting composition in, for example, a bonding, coating, laminating or molding operation. Accordingly, these solution-type resin compositions can be used both as one-package compositions and two-package compositions according to the reactivities of the constituent elements.

The curable resin compositions of invention can be used in the above solution form as adhesives, paints vehicles, molding materials to be impregnated in substrates, or laminating materials. In this case, the concentration of the resin solid in the solution is determined so that the optimum operability can be obtained according to the desired utility.

The resin compositions of this invention can be used for various purposes in the form of dried powder, pellets, resin-impregnated product or compound. For example, compositions with the individual components uniformly mixed can be obtained by uniformly mixing the resin components in solution, and then removing the solvents from the homogeneous solution at reduced pressure or at an elevated temperature. Alternatively, solids components (a) and (b) and if desired together with the amine are kneaded at room temperature or at an elevated temperature to form a homogenized resin composition. This kneading operation can be effected by mechanical means for example, by using a Bumbury mixer or rolls.

If desired, the resin composition of this invention can be used in the form of an emulsion or suspension.

Various additives can be incorporated in the resin compositions of this invention in order to control the curability of the resin, modify the properties of the resin or to impart the desired properties to the final resin products.

The resin composition of this invention has the property of being converted to a cured thermally stable resin by heating. In order to promote the curing, catalysts may be incorporated in the composition. Examples of suitable curing catalysts are organic bases, for example, tertiary amines such as N,N-dimethyl aniline, N,N-dimethyl toluidine, N,N-dimethyl-p-anisidine, p-halogeno-N,N-dimethyl anilines, 2-N-ethyl anilino ethanol, tri-n-butyl amine, pyridine, quinoline, N-methyl morpholine, and triethanolamine, or imidazoles such as imidazole or benzimidazole; phenols such as phenol, cresol, xylenol, resorcinol, or phloroglucin; organic metal salts such as lead naphthenate, lead stearate, zinc naphthenate, tin oleate, dibutyl tin maleate, manganese naphthenate, cobalt naphthenate, lead salt of resin acid, and chlorides such as $ZnCl_2$, $SnCl_4$ or $AlCl_3$. The amount of the catalyst varies considerably according to the type of the catalyst, the utility or curing conditions. But they can be used in catalytic amounts in the general sense of the words, for example, not more than 5% by weight based on the total resin solids content.

In order to improve the properties of the resin in coated films, adhesives and molded articles as final products, various natural, semi-synthetic or synthetic resins can be incorporated in the composition of this invention. Examples of such resins are oleorosins such as drying oils and non-drying oils, rosin, shellac, copal oil-modified rosin, phenolic resins, alkyd resins, urea resins, melamine resins, polyester resins, vinyl butyral resins, vinyl acetate resins, vinyl chloride resins, acrylic resins, and silicone resins. They can be used either alone or in admixtures of two or more. These resins can be incorporated in amounts which do not affect the desirable properties of the cured resins to be obtained from the resin composition of this invention, for example, in an amount of not more than 30% by weight of the total amount of the resin.

The resin composition of this invention may further contain a reinforcing agent or filler in a fibrous or powdery form. Examples of the powdery reinforcing agents or fillers are inorganic powders, such as various carbon blacks, finely divided silica, calcined clay, basic magnesium silicate, powdery diatomaceous earth, alumina, calcium carbonate, magnesium carbonate, magnesia, kaolin, sericite, or mica. Examples of the fibrous reinforcing material are inorganic fibers such as ceramic fibers, asbestos, rock wool, glass fibers, slag wool, or carbon fibers, paper, pulp, wodden powder, cotton, linter, and various synthetic fibers such as polyimide fibers. The fibrous reinforcing material can be used in various forms such as fine fibers, staples, tows, webs, woven fabrics, or non-woven fabrics. These reinforcing materials or fillers can be used in an amount of up to 4 times the weight of the resin solid for use as laminating materials or molding materials, although the amount may vary according to the desired utility.

The resin compositions of this invention can also contain a white pigment such as titanium dioxide, a colored pigment such as yellow lead, carbon black, iron black, molybdenum red, prussian blue, ultramarine, cadmium yellow or cadmium red, and other various organic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickner, a coat modifier, a body pigment or a fire retardant, which are known additives for paints.

The resin composition of this invention is cured by heating after applying it to a substrate as a coating or adhesive layer, or after molding or laminating in the form of powder, pellet or as impregnated in a substrate. The temperature at which the resin composition of this invention is cured is generally 0° to 300° C., preferably 100° to 250° C., although differing according to the presence of a catalyst or curing agent or its amount, or the types of the components in the composition. The time required for heating is generally 30 seconds to 10 hours, although considerably differing according to whether the resin composition is used as a thin coating or as molded articles of relatively large thickness or as laminates. When the resin composition of this invention is used for producing molded articles, laminated articles or bonded structures, the curing is desirably effected under pressure. Generally, this pressure is from 10 to 100 $Kg/cm^2$ (gauge).

In order to cure the resin composition of this invention, other means such as ionizing radication or irradiation of light (ultraviolet rays) can be used. Ionizing radiation may be effected by electron beams from various accelerators, or gamma rays from isotopes such as cobalt-60. Light sources for photocuring may be sunlight, tungsten lamps, arc lamps, xenon lamps, halogen lamps, or low pressure or high pressure mercury lamps. In the case of photocuring, known photosensitizers, for example, organic carbonyl compounds such as benzoin, benzoin methyl ether, benzoin ethyl ether, benzoin propyl ether, anthraquinone, or benzophenone, or combinations of sensitizing dyes such as eosine, erythrosine or acridine can be added to the resin composition of this invention in an amount of up to 5% by weight based on the resin solids content. The method of curing by ionizing radiation or ultraviolet rays is advantageous when the resin composition of this invention is used for coating. Since the novel curable resin compositions of this invention has the advantage that they exhibits a relatively fast rate of curing and can be cured under relatively mold conditions, they can be used in various applications with superior operability and producitivity. Cured resins obtained by curing these resin compositions have desirable combination of superior adhesion or intimate contact, thermal stability and electrical characteristics, and also superior mechanical characteristics, chemical resistance and moisture resistance. The compositions of this invention have found a wide range of utility, such as rust-proof, fire-proof, flame-proof and other paints, electrically insulating varnishes, adhesives, laminated materials suitable for furniture, architectural materials, exterior decorating materials, and electrically insulating materials, or various molding resins.

The following Examples illustrate the present invention in greater detail.

In the following Examples, the acid numbers and amine numbers were measured by the following methods.

ACID NUMBER

About 0.1 g of a sample is dissolved in 50 cc of dimethyl formamide, and the acid number is measured by means of a 1/10 N methanol solution of potassium hydroxide using phenolphthalein as an indicator.

AMINE NUMBER

About 0.1 g of a sample is dissolved in 50 cc of a mixed solvent consisting of 4 parts by volume of phenol, 1 part by volume of ethanol and 3 parts by volume of water, and the electrical conductivity of the sample is measured by means of a 1/10 N methanol solution of $HClO_4$.

EXAMPLE 1

90 Parts by weight, as solids content, of a methyl ethyl ketone solution of a mixture with an average molecular weight of 500 of a cyanate ester monomer derived from bisphenol A and a cyanogen halide and a prepolymer thereof (KU 6573) was mixed with 10 parts by weight, as solids content, of an N-methyl pyrrolidone solution of a bismaleimide-diamine prepolymer consisting mainly of the reaction product of a bismaleimide derived from maleic anhydride and 4,4'-bisaminophenyl methane with 4,4'-bisaminophenyl methane (KERIMID 601). 2 Parts by weight, based on the solids content of the resins, of 2-ethyl-4-methylimidazole was dissolved in the mixture obtained.

The gellation time of the mixed solution at 160° C. was 258 seconds. The resulting mixed solution was impregnated in a glass cloth, and dried at 140° C. for 5 minutes to afford a B-stage (half cured) prepreg having a gellation time at 170° C. of 60 seconds. Several sheets of the prepreg were laminated, and a copper foil was further overlaid on top of the laminate, and the assembly was pressed at 30 Kg/cm² at 170° C. for 2 hours. There was obtained a highly heat resistant, self-extinguishing copper-clad laminated plate having a heat distortion temperature of more than 250° C. The peel strength of the copper foil was 2.4 Kg/cm which was more than that of a copper-clad epoxy resin laminate.

EXAMPLE 2

The resin composition obtained in Example 1 was mixed with 60 parts by weight of silica, 0.3 part by weight of stearic acid as a mold-releasing agent, and 0.3 part by weight of carbon black as a pigment. The mixture was dried at 50° C. in vacuo to remove the solvent. The resulting solid was pulverized, and molded at a pressure of 150 Kg/cm² and a temperature of 160° C. to form a molded article having a heat distortion temperature of more than 250° C. and superior self-extinguishing property.

EXAMPLE 3

A methyl ethyl ketone solution of 33 parts by weight of KU 6573 used in Example 1, an N-methyl pyrrolidone solution of 52 parts by weight of a bismaleimide obtained from maleic acid and 4,4'-bisaminophenyl methane and a methyl ethyl ketone solution of 15 parts by weight of 4,4'-bisaminophenyl methane were mixed with each other. The mixture was stirred for 15 minutes at 40° C., and then, 1 part by weight of 2-ethyl-4-methylimidazole was mixed with it. The resulting mixture was impregnated in a base material to form a B-stage prepreg, which was formed into the same laminate as in Example 1 by the same procedure as in Example 1.

EXAMPLE 4

90 Parts by weight of bismaleimide derived from maleic anhydride and 4,4'-bisaminophenylmethane were dissolved in N-methyl pyrrolidone, and 10 parts by weight of a cyanate ester monomer derived from bisphenol A was mixed with the solution. The mixture was stirred for 10 minutes at 40° C., and the same filler as used in Example 2 was mixed. The mixture was dried by heating at reduced pressure to form a solid. The solid was pulverized, and molded at 160° C. and 150 Kg/cm² to form a thermally stable molded article.

EXAMPLE 5

KERIMID 601 and KU 6573 used in Example 1 were mixed with each other and the mixture was heated to a cured product. The relation of the mixing ratio and the gellation time at 170° C. is shown in Table 1.

Table 1

| Amount of KERIMID 601 (parts by weight) | Amount of KU 6573 (parts by weight) | Gellation time at 170° C. (seconds) |
|---|---|---|
| 100 | 0 | 180 |
| 95 | 5 | 124 |
| 90 | 10 | 78 |
| 75 | 25 | 56 |
| 40 | 60 | 48 |
| 10 | 90 | 780 |
| 0 | 100 | 33350 |

EXAMPLE 6

When each of the bismaleimides shown below was mixed with KU 6573 used in Example 1, and the mixture was heated, it reacted and cured. The relation between the type of the bismaleimide and the gellation time at 170° C. is shown in Table 2.

(1) Bismaleimide using 4,4'-bisaminophenylmethane:

This bismaleimide was prepared by the method disclosed in Japanese Patent Publication No. 29140/71 which comprises dissolving 0.11 mol of the above diamine, 0.22 mol of maleic anhydride in dimethyl formamide, together with acetic anhydride and sodium acetate and reacting them at 50° C. to 65° C. for 4 hours, and then pouring the reaction product into ice water. The resulting 4,4'-bisaminophenyl methane bismaleimide had a melting point of 153° to 157° C., an acid number of 283.5 and an amine number of 6.2.

(2) m-Phenylene bismaleimide having a melting point of 196° to 198° C., an acid number of 364.0 and an amine number of 12.1 was prepared from m-phenylene diamine and maleic anhydride in a similar manner to that used in (1) above.

(3) m-Xylylene bismaleimide having a melting point of 120° to 123° C., an acid number of 333.9 and an amine number of 3.4 was prepared from m-xylylenediamine and maleic anhydride in a similar manner to that used in (1) above.

Table 2

| Amount of KU 6573 (parts by weight) | 100 | 90 | 90 | 90 | 50 | 50 | 50 |
|---|---|---|---|---|---|---|---|
| (1) Amount of 4,4'-aminophenyl | | | | | | | |

Table 2-continued

| | | | | | | | |
|---|---|---|---|---|---|---|---|
| methane bis-maleimide (parts by weight) | 0 | 10 | 0 | 0 | 50 | 0 | 0 |
| (2) Amount of m-phenylene bis-maleimide (parts by weight) | 0 | 0 | 10 | 0 | 0 | 50 | 0 |
| (3) Amount of m-xylylene bis-maleimide (parts by weight) | 0 | 0 | 0 | 10 | 0 | 0 | 50 |
| Gellation time at 170° C. (seconds) | 3350 | 72 | 74 | 69 | 58 | 77 | 48 |

EXAMPLE 7

KU 6573 used in Example 1, 4,4'-bisaminophenyl methane bismaleimide used in Example 6 and 2-ethyl-4-methylimidazole were mixed in the proportions indicated in Table 3 and heated whereby they reacted to form a cross-linked product. The gellation time at 170° C of each of the mixtures obtained is shown in Table 3.

Table 3

| | Amount (parts by weight) | | |
|---|---|---|---|
| KU 6573 | 100 | 90 | 50 |
| 4,4'-bisamino-phenylmethane bismaleimide | 0 | 10 | 50 |
| 2-Ethyl-4-methylimidazole | 3 | 3 | 3 |
| Gellation time at 170° C. (seconds) | 520 | 400 | 35 |

EXAMPLE 8

When KERIMID 601 used in Example 1, KU 6573 used in Example 1 and 2-ethyl-4-methylimidazole were mixed with each other in the proportions shown in Table 4 and heated, they reacted to form a cross-linked product. The gellation time of each of the mixtures is shown in Table 4.

Table 4

| | | | | | | | |
|---|---|---|---|---|---|---|---|
| KU 6573 (parts by weight) | 100 | 90 | 70 | 50 | 30 | 10 | 0 |
| KERIMID 601 (parts by weight) | 0 | 10 | 30 | 50 | 70 | 90 | 100 |
| 2-Ethyl-4-methyl-imidazole (parts by weight) | 3 | 3 | 3 | 3 | 3 | 3 | 3 |
| Gellation time at 170° C. (seconds) | 520 | 185 | 47 | 30 | 51 | 54 | 60 |

EXAMPLE 9

A solution of 90 parts by weight of KERIMID 601 used in Example 1 in N-methyl pyrrolidone was mixed uniformly with a solution of 10 parts by weight of KU 6573 in methyl ethyl ketone. The mixed solution was further mixed with 5 parts by weight of glass fibers and 55 parts by weight of silica. The mixture was dried at 50° C. in vacuo to remove the solvent. The resulting solid was pulverized and molded at 160° C. and 160 Kg/cm², and then post-cured at 200° C. for 1 hour.

There was obtained a self-extinguishing product having a heat distortion temperature of 250° C.

EXAMPLE 10

When KU 6573 used in Example 1, KERIMID 601 used in Example 1 and DER 542 (a tradename for a diglycidyl ether of tetrabromobisphenol A having an epoxy equivalent of 325–375, a product of Dow Chemical company, U.S.A.) were mixed in the proportions shown in Table 5 and heated, they reacted to form a unitary composition. The relation of the mixing ratio and the gellation time at 170° C. is shown in Table 5.

Table 5

| Samples | 1 | 2 | 3 | 4 | 5 | 6 | 7 | 8 |
|---|---|---|---|---|---|---|---|---|
| KERIMID 601 (parts by weight) | 100 | 90 | 82 | 9 | 0 | 0 | 10 | 0 |
| KU 6573 (parts by weight) | 0 | 10 | 9 | 82 | 90 | 100 | 20 | 30 |
| DER 542 (parts by weight) | 0 | 0 | 9 | 9 | 10 | 0 | 70 | 70 |
| Gellation time at 170° C. (seconds) | 180 | 78 | 84 | 702 | 780 | 3350 | 201 | 283 |

EXAMPLE 11

Compositions obtaned by adding 3 parts by weight of 2-ethyl-4-methylimidazole (2E4MZ for short) to the compositions obtained in Example 10 had the gellation time shown in Table 6

Table 6

| Samples | 1 | 2 | 3 |
|---|---|---|---|
| KERIMID 601 (parts by weight) | 82 | 9 | 10 |
| KU 6573 (parts by weight) | 9 | 82 | 20 |
| DER 542 (parts by weight) | 9 | 9 | 70 |
| 2E4MZ (parts by weight) | 3 | 3 | 3 |
| Gellation time at 170° C. (seconds) | 57 | 107 | 130 |

EXAMPLE 12

When EPIKOTE 1001 (a trademark for an epoxy DGEBA resin having an epoxy equivalent of 450 to 550, a product of Shell Chemical), meta-phenylene bis-maleimide having a melting point of 196° to 198° C., an acid number of 364.0 and an amine number of 12.1 prepared from meta-phenylene diamine and maleic anhydride, KU-6573 and 2-ethyl-4-methylimidazole were mixed and heated, they reacted to form a crosslinked product.

The gellation time at 170° C. of each of the mixtures is shown in Table 7.

Table 7

| Samples | 1 | 2 | 3 |
|---|---|---|---|
| KU 6573 (parts by weight) | 25 | 50 | 25 |
| m-Phenylene bismale-imide (parts by weight) | 25 | 25 | 50 |
| EPIKOTE 1001 (parts by weight) | 50 | 25 | 25 |
| 2-Ethyl-4-methyl-imidazole (parts by weight) | 3 | 3 | 3 |
| Gellation time at | | | |

Table 7-continued

| Samples | 1 | 2 | 3 |
|---|---|---|---|
| 170° C. (seconds) | 160 | 71 | 47 |

EXAMPLE 13

Sample 2 in Example 11 (consisting of 82 parts of KU 6573, 9 parts of KERIMID 601, 9 parts of DER 542, and 3 parts of 2-ethyl-4-methylimidazole) was dissolved in a mixture of N-methyl pyrrolidone and methyl ethyl ketone, and the solution was inpregnated in a glass cloth. By heating the impregnated cloth, a B-stage prepreg was prepared by heating at 140° C. for 5 minutes.

Several sheets of the prepreg were superimposed, and on this laminate was further overlaid a copper foil. The assembly was molded for 3 hours at 180° C. and 40 Kg/cm² to form a laminated plate. The plate assumed dark red color. It was a self-extinguishing copper-lined laminate having a copper foil peel strength of 2.2 Kg/cm and a dielectric constant of 4.5 (1 MHz).

What we claim is:
1. A curable resin composition comprising:
 (a) a cyanate ester component selected from the group consisting of:
  (i) polyfunctional aromatic cyanate ester monomers having the formula:

wherein $n$ is at least 2 and not more than 5 and R is an aromatic organic group, the cyanate groups being bonded to an aromatic ring of said aromatic organic group,
  (ii) homoprepolymers of (i) and
  (iii) coprepolymers of (i) and an amine, said amine being a diamine of the formula $H_2N — R^2 — NH_2$, wherein $R^2$ is a divalent aromatic or alicyclic organic group, or a member selected from the group consisting of hexamethylenetetramine, polyethyleneimine, polyamino styrene, polyvinyl imidazole, triethylene diamine, 2-methylimidazole, 2-undecyclimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole, and adducts formed between these imidazoles and trimellitic acid and
 (b) a bismaleimide component selected from the group consisting of (i) bismaleimides, (ii) bismaleimide homoprepolymers and (iii) bismaleimide coprepolymers of (i) and amines as above-defined, the weight ratio of component (a) to (b) being 1:99 to 99:1.

2. The curable resin composition of claim 1 which further contains an amine as defined in claim 10 as component (d) in an amount of up to 10% by weight based on the total weight of the components (a), (b) and (d).

3. The curable resin composition of claim 2 wherein the amount of the amine as component (d) is 0.05 to 5% by weight based on the total weight of the components (a), (b) and (d).

4. The curable resin composition according to claim 1 wherein the cyanate ester homoprepolymer (a) (ii) has an average molecular weight of between 400 and 6,000; and the bismaleimide coprepolymer (b) (iii) has the formula:

where $m$ is zero or a positive number, up to about 10, and $R^2$ is the same as defined hereinabove.

5. The curable resin composition of claim 4 wherein in the case of (i), ratio (I) is 0.1 to 3; in the case of (II), ratio (IIa) is 0.34 to 1 and ratio (IIb) is 0.34 to 1; and ratio (III) is 0.05 to 5% by weight.

6. A curable resin composition according to claim 1 wherein:
 (a) the cyanate ester component is a prepolymer of a polyfunctional aromatic cyanate ester monomer having at least two cyanate groups bonded to the aromatic ring thereof and
 (b) the bismaleimide component is a prepolymer of the bismaleimide and amine.

7. A curable resin composition according to claim 1 wherein:
 (a) the cyanate ester component is a prepolymer of a polyfunctional aromatic cyanate ester monomer having at least two cyanate groups bonded to the aromatic ring thereof and
 (b) the bismaleimide component is a bismaleimide monomer.

8. A curable resin composition according to claim 7 wherein
 said cyanate ester component (a) comprises a prepolymer of a cyanate ester monomer prepared by reacting bisphenol A and a cyanogen halide and
 said bismaleimide component (b) comprises 4,4'-bisaminophenyl methane bismaleimide.

9. A curable resin composition according to claim 8 wherein said cyanate ester component (a) comprises a cyanate ester monomer in admixture with said prepolymer, said admixture having an average molecular weight of 500.

10. The curable resin composition according to claim 1 wherein the diamine is selected from the group consisting of m-phenylene diamine, m-, or p-xylylendiamine, 1,4-cyclohexane diamine, hexahydroxylylene diamine, 4,4'-bisaminophenyl methane, 4,4'-bisaminophenyl sulfone, bis(4-amino-3-methylphenyl)methane (DMT), bis(4-amino-3,5-dimethylphenyl) methane (MDX), 4,4'-bisaminophenylcyclohexane, 4,4'-bisaminophenyl ether, 2,2-bis(4'-aminophenyl)propane, 2,2-bis(4-amino-3-methylphenyl)methane, and α,α-bis(4'-aminophenyl)phenylmethane.

11. The curable resin composition of claim 10 which further comprises (c) an epoxy compound component having an epoxy equivalent of 70 to 6,000 and being prepared by reacting an epihalohydrin with a polyhydric phenol or an amine as defined in claim 10 and (d) an amine component as defined in claim 10, the amount of the component (c) satisfying the following conditions:

(i) when the amount of major component, component (a) or (b) is 65 to 95% by weight based on the total amount of the components (a) and (b), ratio (I) given by the following equation $$\text{ratio (I)} = \frac{\text{Mols of component (c)}}{\text{Mols of major component}}$$

is 0.05 to 4, and (ii) when the amount of each of the components (a) and (b) is more than 35% by weight to less than 65% by weight based on the total amount of components (a) and (b), ratio (IIa) and ratio (IIb) given by the following equations $$\text{ratio (IIa)} = \frac{\text{Mols of component (a)}}{\text{Mols of component (c)}}$$

$$\text{ratio (IIb)} = \frac{\text{Mols of component (b)}}{\text{Mols of component (c)}}$$

are both not more than 1, and the amount of component (d) being such that ratio (III) given by the following equation $$\text{ratio (III)} = \frac{\text{Weight of component (d)} \times 100}{\text{Total weight of (a) + (b) + (c) + (d)}} \, (\%)$$

is up to 10% by weight.

* * * * *